Aug. 24, 1926.
L. L. SLONAKER
1,597,629
AUTOMOBILE LOCK
Filed April 28, 1925    2 Sheets-Sheet 1
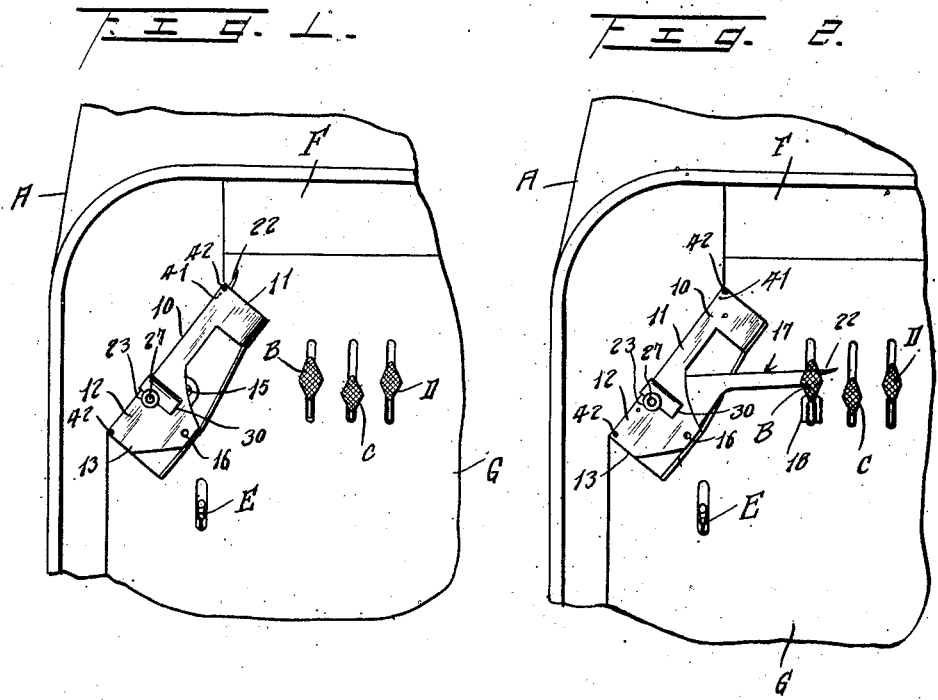
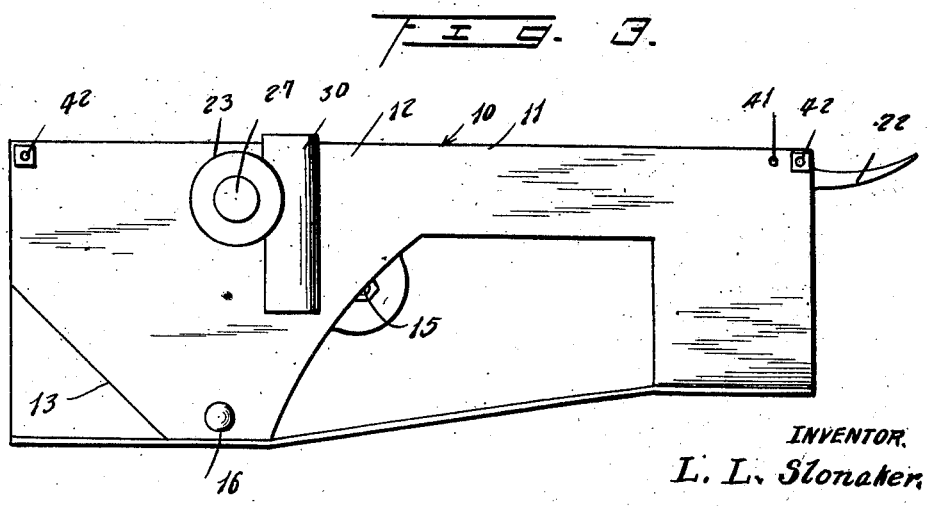
INVENTOR.
L. L. Slonaker.
BY
Attorney.

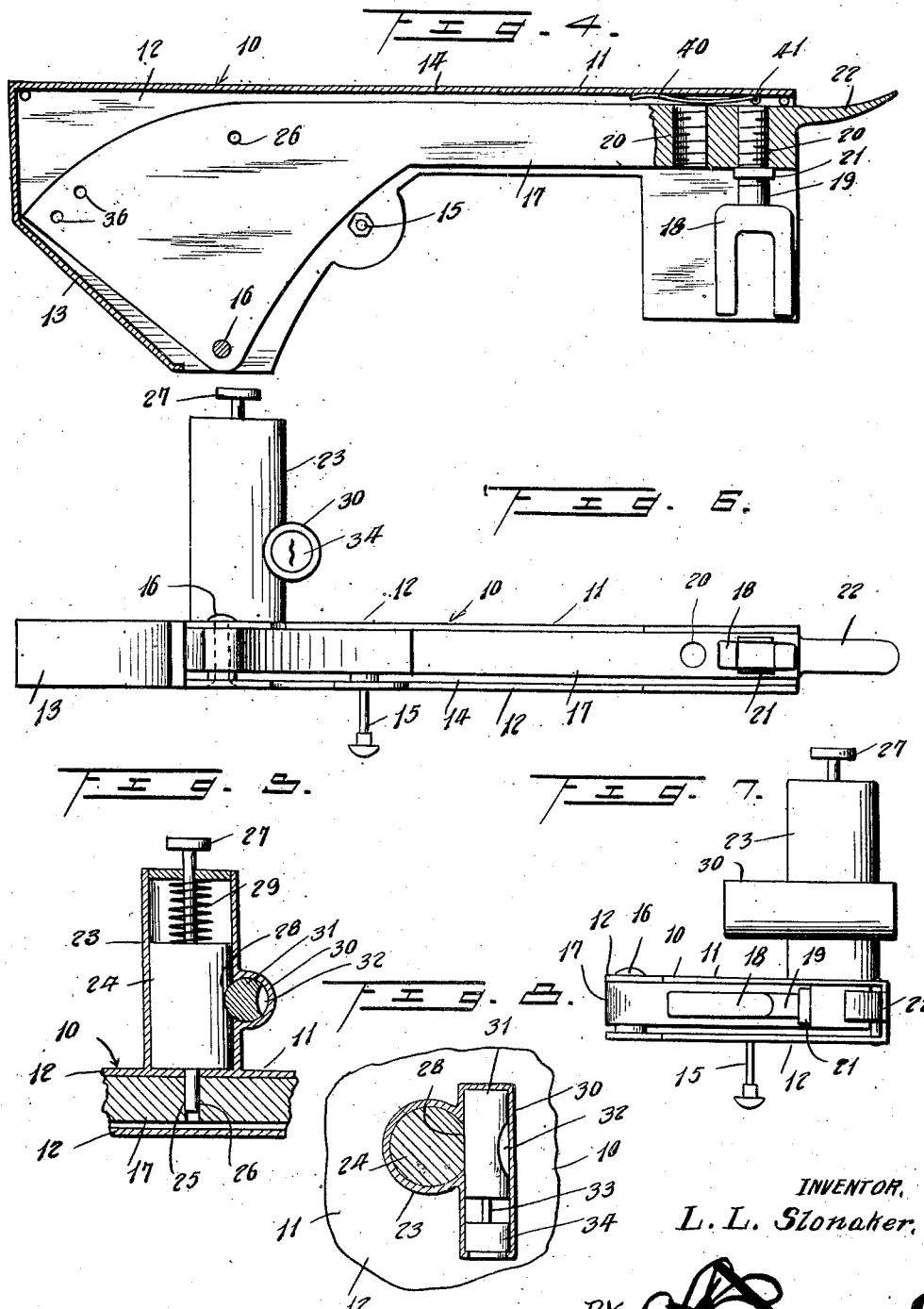

Patented Aug. 24, 1926.

1,597,629

UNITED STATES PATENT OFFICE.

LELAND L. SLONAKER, OF DETROIT, MICHIGAN.

AUTOMOBILE LOCK.

Application filed April 28, 1925. Serial No. 26,433.

This invention relates to an automobile lock.

It is aimed to provide a novel construction of lock for engagement with and disengagement from a control part of an automobile to reduce the theft hazard and a construction which is visible, compact, may be readily operated and will occupy minimum space in the automobile.

Another object is to provide a novel construction of means adapted for engagement with the clutch pedal lever of a Ford automobile in order to lock the same in high gear position.

Another object is to provide a construction wherein the fastening means for the lock casing is covered by the part which engages and locks said pedal lever, when in locked position.

Another object is to provide a novel construction wherein the parts are adjustable to suit different conditions.

Additional objects and advantages will become apparent from a consideration of the description following taken in connection with accompanying drawings illustrating an operative embodiment.

In said drawings:—

Figure 1 is a view showing my improvements as applied to a Ford automobile but in unlocked position;

Figure 2 is a view similar to Figure 1 but showing the parts in locked position;

Figure 3 is a plan view of the lock on an enlarged scale;

Figure 4 is a plan view of the lock with the upper portion of the casing removed to disclose details;

Figure 5 is a vertical sectional view taken through the locking device proper;

Figure 6 is an edge view of the locking device looking towards the open side thereof;

Figure 7 is an end view of the lock, and

Figure 8 is a perspective view of parts of the lock device to disclose the details thereof.

Referring specifically to the drawings, an automobile is conventionally shown at A which may be a Ford and of which the clutch pedal lever is shown at B in its usual relation with respect to the other operating parts thereof particularly the reverse pedal lever C, the service brake pedal D and the emergency brake lever E. Within the body of the automobile at a forward corner thereof relatively close to the dash or instrument board F and to the frame of the car adjacent to the floor board G, the lock generally designated 10, forming the subject of the present invention is fastened. This lock has a casing as at 11 which may be cast in a single piece if desired or be made in a plurality of parts or in fact made of any approved construction. The casing 11 has upper and lower spaced parallel similar walls 12, connected at one end by an upstanding wall 13 and along one side by an upstanding wall 14. A fastening element such as a bolt or a screw 15 is adapted to be passed through an aperture in the bottom wall 12 and thence through the frame of the car.

Normally disposed within the housing 11 and pivoted thereto by a non-removable stud 16, is a locking arm 17 of appropriate shape adapted for engagement with the clutch pedal lever B through projection from its lowest position as in Figure 1 to the position shown in Figure 2 and at its distal end has a yoke 18 in the recess or bifurcation of which the pedal B is adapted to be engaged. The yoke 18 has a shank 19 screw threaded into either screw threaded opening 20 of the arm 17, and adapted to be secured against accidental displacement by a lock nut 21 on the shank 19 arranged in abutting relation to the arm. A finger piece 22 integral with arm 17 extends from its distal end outwardly beyond the casing 11.

The upper wall 12 has a relatively large opening therethrough which is surrounded by a casing, rigid or integral therewith, as designated at 23. Slidably disposed in the cylindrical casing 23 for vertical movement is a lock bolt 24 which has a depending pin 25 adapted for engagement in an opening or aperture 26 in the arm 17 in order to lock or hold the latter in its retracted position of Figure 1. A stem 26ª rises from the bolt 24, passing through the upper wall of housing 23 and above the same having a knob or handle 27 thereon. The bolt 24 is notched at one side thereof as at 28 and an expansive spring 29 surrounds the stem 26, bearing against bolt 24 and the top wall of housing 23, thus urging the bolt downwardly.

Casing 23 has an enlargement 30 in which a latch 31 is operatively mounted. Latch 31 may be in the form of a cylinder mounted on a horizontal axis, and adapted for extension at its periphery into the notch 28 to thereby lock the bolt 24 against movement. It will be noted that the latch 31 has a notch 32 in its side which may be brought opposite to notch 28, when the bolt 24 is released for operation, in order to provide the proper clearance. The latch 31 is adapted for appropriate control and has a stem 33 extending therefrom into a pin tumbler mechanism 34, adapted to be actuated by a key. Such mechanism is common in locks and accordingly a detail description thereof is unnecessary.

When the arm 17 is projected, the pin 25 is adapted to extend into either of the openings or apertures 36 to hold and lock the arm 17 in such position.

When the arm 17 is in the said projected position as in Figure 2, the clutch pedal lever B must be in its normal position where the parts of the transmission are in high gear so that the vehicle cannot be operated. When in this position, in order to release the parts for operation of the car, the owner places the key into the mechanism 34, thus operating it and accordingly the latch 31 to aline the notches 28 and 32, after which the knob 27 is grasped and pulled upwardly thus releasing the arm 17 so that it may be pulled by hand or pushed by foot through engagement with the bail 22, to retracted position subsequent to which the knob 27 is released and pin 25 enters the recess 26, thereby holding the arm 17 retracted. In this position, the arm may be locked if desired although it is unnecessary.

Attention is called to the fact that when the arm 17 is projected, it covers and snugly fits the parts about the fastening 15 to preclude tampering with or removal of such fastening and to render the fastening of the device by a single bolt or the like to be practical.

Fastened to the inner side of the wall 14, is a bowed leaf spring 40, being secured as by a pin 41 or otherwise, which engages the arm 17 and serves as an anti-rattler. In addition when the arm is retracted, this spring is placed under tension thereby so that when the arm 17 is released by the bolt lug 25, the spring will spend its energy and partly project the arm 17 from the casing to facilitate engagement therewith to move it to locking position.

Optionally, at certain points, reenforcing and rigidifying studs 42 may be employed and secured to the wall 12 as shown.

Various changes may be resorted to provided they fall within the spirit and scope of the invention.

I claim as my invention:—

1. A device of the class described comprising a casing, a locking arm pivoted within the casing, means on the casing for locking engagement with said arm, said arm having a plurality of slots associated with the last mentioned means for selective use according to the adjustment of the parts, and an element to engage the part to be locked carried by the arm, said arm having a plurality of supporting means for said element to permit variation in the position of the latter according to the position of the part to be engaged.

2. A device of the class described comprising a casing, a locking arm mounted on said casing, a finger piece extending from said arm beyond the casing for the purpose specified, and means serving dually as an antirattler and to urge initial movement of the arm towards a projected position and arrange said finger piece in position for ease in operation of the locking arm into locking position.

3. A device of the class described comprising a casing, a locking arm pivoted to said casing, said locking arm having a finger piece extending therefrom beyond the casing, a bifurcated element on said arm to engage a control part, said arm having a plurality of screw threaded openings engageable by said bifurcated element, a housing rising from the casing, a locking bolt in said housing, said arm having a recess engageable by said bolt in the retracted position of the arm, said arm having a plurality of openings selectively engageable by the bolt in the projected position of the arm, a spring to urge movement of the bolt to locking position, and a key controlled locking means associated with said bolt.

In testimony whereof I affix my signature.

LELAND L. SLONAKER.